Oct. 22, 1929.                M. LOUGHEAD                1,732,309
                           FLUID OPERATED BRAKE
                           Filed May 23, 1924

Inventor.
Malcolm Loughead
By Williams, Bradbury,
M°Caleb & Hinkle,
Attorneys.

Patented Oct. 22, 1929

1,732,309

UNITED STATES PATENT OFFICE

MALCOLM LOUGHEAD, OF DETROIT, MICHIGAN, ASSIGNOR TO HYDRAULIC BRAKE COMPANY, OF LOS ANGELES, CALIFORNIA, A CORPORATION OF CALIFORNIA

FLUID-OPERATED BRAKE

Application filed May 23, 1924. Serial No. 715,287.

This invention relates to fluid operated brakes, and particularly to power means for assisting the manual operation of placing the fluid under pressure to apply the brakes.

The object of the invention is to provide an assisting means which is operated by the momentum of the vehicle, and one which will not interfere with the manual operation of the system.

Figure 1:
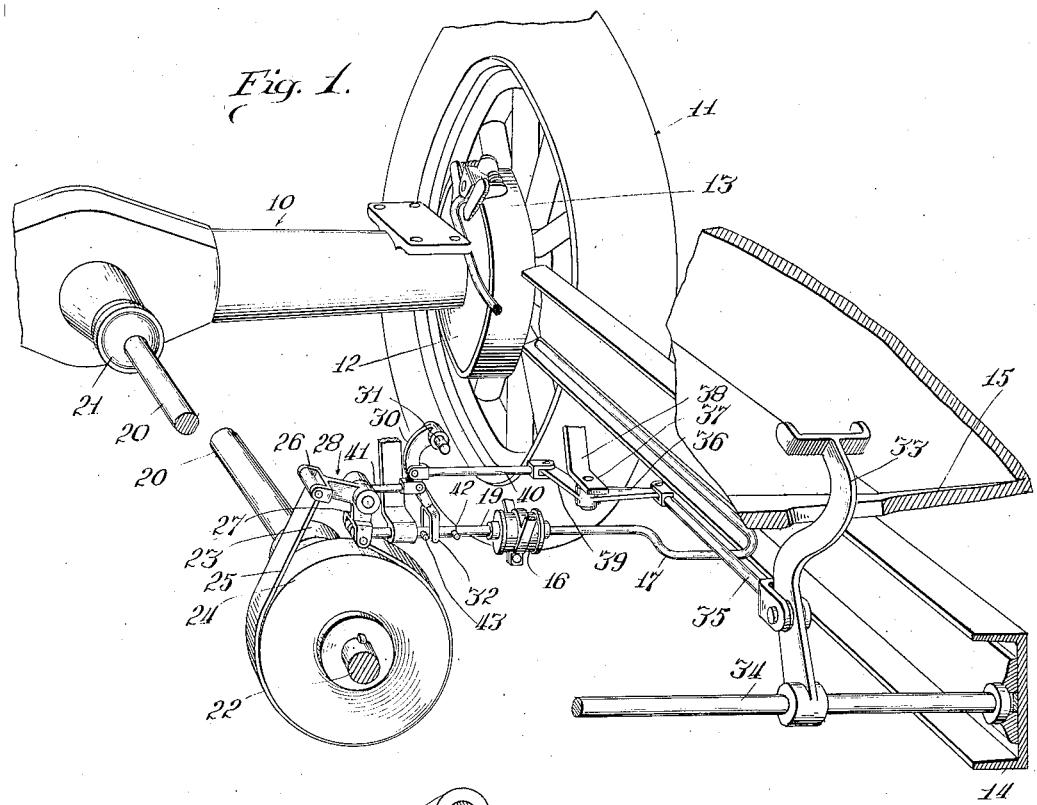
Figure 2:
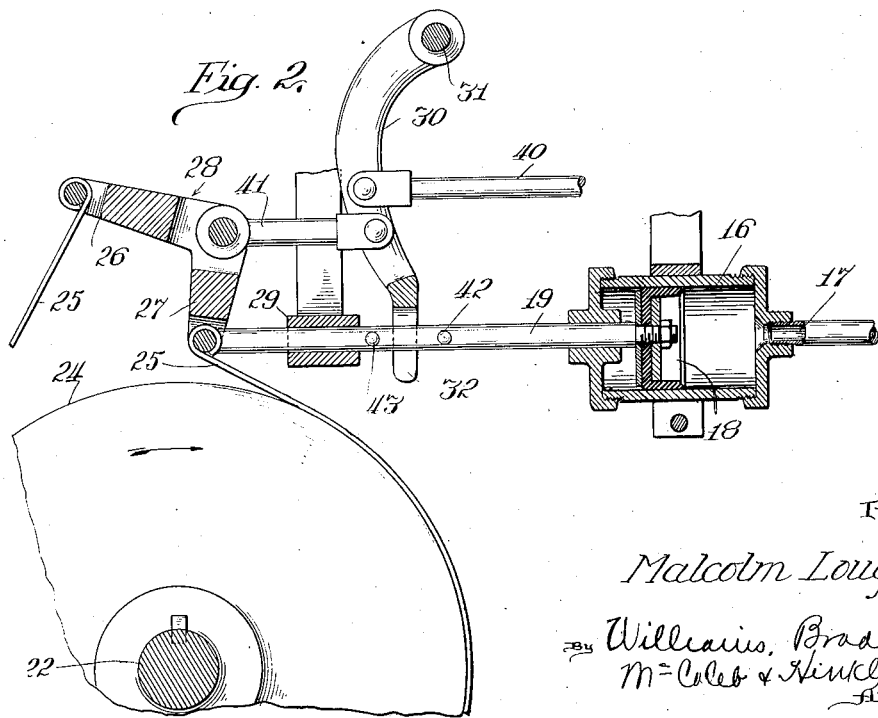

It is believed the invention will be most readily understood from a detailed description thereof taken in connection with the accompanying drawings, in which Figure 1 is a perspective view of a portion of the automobile chassis and rear axle of an automobile showing the braking mechanism carried thereby, and Figure 2 is a detached detail view, partly in section, showing certain details of the fluid compressor operating mechanism.

Referring now to the drawing, in which like reference characters indicate like parts in the several views, 10 indicates a portion of the rear axle of an automobile having the wheel 11 rotatably mounted thereon. At 12 is indicated the closure plate for the brake drum to which is secured the brake operating cylinder in a manner disclosed and described in my co-pending application, Ser. No. 680,292, filed December 13, 1923. Positioned about the brake drum (not shown) is the brake band 13 which may be operated in a manner disclosed in my above mentioned application. A portion of one of the side members of the chassis frame is shown at 14. Mounted upon the sill 14 is the usual toe or foot board 15.

The main compressor cylinder 16, rigidly supported under the floor boards of the car in any desired manner, is joined to the brake operating cylinders by means of the pipe or conduit 17. Slidably mounted within the cylinder 16 is the piston 18 having the laterally extending piston rod 19. The drive shaft of the automobile, indicated at 20, is joined to the rear axle stub shaft through the universal 21 and to the main engine shaft 22 through the universal 23. Fixed to the engine shaft 22 is the clutch or brake drum 24. Encircling the drum 24 is the friction band 25, the opposite ends of which are pivotally joined to the arms 26 and 27 of the bell crank lever 28. The piston rod 19 is slidably supported in the bearing 29, and has its extreme end pivotally joined to the lever arm 27.

The lever 30 is supported on the fixed pivot 31 and has its lower end 32 bifurcated so as to embrace opposite sides of the piston rod 19. The foot brake lever 33 is pivotally supported on the rod 34 and is joined intermediate of its ends by the link 35 to the arm 36 of the bell crank lever which is pivotally supported on the pivot 37 carried by the fixed bracket member 38. Integral with the arm 36 is an arm 39, the end of which is joined through the medium of link 40 to the lever 30. A link 41 joins the lever 30, adjacent to the lower end thereof, to the middle point of the bell crank lever 28. It will be noted that the bifurcations 32 of lever 30 are positioned between the pins 42 and 43 fixed in the piston rod 19 so that there is a lost motion connection between the lever 30 and the piston whereby the movement of the lower end of the lever relative to the piston is limited.

The operation of the device is as follows:

When it is desired to apply the brakes, pressure is applied to the lever 33 and the upper end thereof is moved forwardly. Due to the forward movement of the lever 33, the lever arm 36 is moved forwardly, and the arm 39 integral therewith is moved to the right, as seen in Figure 1. This acts through the medium of link 40 to draw the lower end of lever 30 to the right. As lever 30 moves to the right, the mid point of the bell crank lever 28 is also moved to the right through the medium of link 41. The movement of the arm 27 of bell crank lever 28 is therefore rotated about the pivotal support for its lower end, and causes the band 25 to engage the brake drum 24. It should be here explained that the drum 24 will rotate in a clockwise direction, as viewed in both figures of the drawing, when the car is moving forward. As the brake band 25 engages the drum 24, it tends to move the piston rod 19 to the right, and when the friction becomes great enough to overcome the resistance of the piston and the fluid in the cylinder, the piston 18 is moved to the right to apply pressure to the fluid and force it through pipe 17 into the brake operating cylinders and apply the brakes. The brake band is maintained in engagement with the brake drum during this movement by the pressure of the operator's foot on the lever 33.

Should the brake band 25 for any reason fail to engage the brake drum with sufficient friction to operate the piston, the piston will be forced inwardly by reason of the bifurcations 32 engaging the pin 42. Thus the brakes may be manually actuated should the power means fail to operate them.

The assisting means herein disclosed will not function to stop the car when it is traveling in a reverse or backward direction. In this case, the brakes would be actuated entirely through the medium of the foot lever 33. Assuming that the car is backing, the brake drum 24 will be rotating in a counter-clockwise direction, as viewed in the figures of the drawing. Now if the lower end of lever 30 is moved to the right, as above explained, there will be a tendency to cause the brake band to grasp the brake drum as before, but due to the fact that the drum is rotating in the reverse direction, the drum will draw on the part of the band joined to the arm 26 and will cause the arm slightly to rotate and loosen the band. The continued movement of the foot lever, however, will bring the bifurcations 32 into contact with the pin 42, and the piston 18 will be forced into the cylinder to compress the fluid and apply the brakes. The same operation will occur when it is desired to apply the brakes when the car is stationary, or practically stationary, as the band 25 under this condition will simply slide around the drum 24 without engaging it with sufficient force to materially retard the operation.

While in the drawings and in the above description but a single set of details has been disclosed, it is to be understood that applicant contemplates many modifications in the structure of his mechanism and the invention, therefore, should be limited merely by the scope of the appended claims.

The applicant claims:

1. In a fluid operated brake system for vehicles, a compressor cylinder, a piston slidably mounted in said cylinder, a friction member connected to rotate with a wheel of the vehicle, a second friction member, means joining said second friction member to said piston, a lever for causing the operative engagement of said second friction member with the first mentioned friction member, and a lost motion connection between said lever and said piston.

2. In a fluid operated brake system for vehicles, a compressor cylinder, a piston mounted in said cylinder, a friction drum connected to rotate with a wheel of the vehicle, a friction band about said drum, means joining said band to said piston and a lever for operatively engaging said band with said friction member.

3. In a fluid operated brake system for vehicles, a compressor cylinder, a piston slidably mounted in said cylinder, a friction member connected to rotate with a wheel of the vehicle, a second friction member, means joining said second friction member to said piston, a lever for causing operative engagement of said first and second friction members, and a lost motion connection between said lever and said piston.

4. In a fluid operated brake system for automobiles, a compressor cylinder, a piston slidably mounted in said cylinder, a friction member connected to rotate with the driving shaft of the automobile, a second friction member, means joining said second friction member to said piston, a lever for causing operative engagement between said second friction member with the first mentioned friction member, and a lost motion connection between said lever and said piston.

5. In a fluid operated brake system for automobiles, a compressor cylinder, a piston slidably mounted in said cylinder, a friction drum connected to rotate with the drive shaft in the automobile, a friction band about said drum, means joining said band to said piston and a lever for operatively engaging said band with said friction member.

6. In a fluid operated brake system for automobiles, a compressor cylinder, a piston slidably mounted in said cylinder, a friction member connected to rotate with the drive shaft of the automobile, a second friction member, means joining said second friction member to said piston, a lever for causing operative engagement of said band with said friction member, and a lost motion connection between said lever and said piston.

7. In a fluid operated brake system for automobiles, a compressor cylinder, a piston slidably mounted in said cylinder, a drum carried by the drive shaft of the automobile, a friction band about said drum, a lever to which the ends of said band are joined, a piston rod joining said piston to said lever and means for actuating said lever to engage said band with said drum.

8. In a fluid operated brake system for automobiles, a compressor cylinder, a piston slidably mounted in said cylinder, a drum carried by the drive shaft of the automobile, a friction band about said drum, a bell crank lever to the opposite ends of which the ends of said band are joined, a piston rod joining said piston to said lever adjacent to one end thereof and means engaging said lever intermediate its ends for causing said band to engage said drum.

9. In a fluid operated brake system for automobiles, a compressor cylinder, a piston slidably mounted in said cylinder, a drum carried by the drive shaft of the automobile, a friction band about said drum, a bell crank lever to the opposite ends of which the ends of said band are joined, a piston rod joining said piston to said lever adjacent to one end thereof, a second lever, means joining said second lever to said first mentioned lever intermediate its ends and a lost motion connection between said second mentioned lever and said piston rod.

10. A brake system for automobiles comprising in combination fluid pressure operated wheel brakes, a fluid compressor therefor, a brake drum driven by one of the road wheels, a brake band co-operating therewith, a bell crank, the arms of which are connected with the respective ends of the band, one of the arms extending toward the axis of the drum and being connected to operate the compressor, and an operating lever connected with the intermediate pivot point of the bell crank.

11. An automobile brake system comprising fluid pressure operated wheel brakes, a compressor therefor, a driving friction member, and a driven friction member cooperating to receive power therefrom and connected to actuate said compressor, and a lever for controlling the engagement of the two friction members to actuate the compressor, the lever being arranged, through a lost motion connection, to actuate the compressor directly.

12. A brake system for automobiles comprising in combination fluid pressure operated wheel brakes, a fluid compressor therefor, means actuated by a moving part of the driving mechanism of the automobile for operating the compressor, a foot pedal for controlling the operation of the compressor by said means and other means associated with the foot pedal and the compressor for operating the compressor by actuation of the foot pedal should the compressor operating means become ineffective.

13. A brake system for automobiles having drive wheels and driving mechanism in constant driving connection therewith, comprising in combination fluid pressure operated wheel brakes, a fluid compressor having a moving part, for supplying fluid pressure to the wheel brakes, a clutch for connecting the driving mechanism with the moving part of the compressor at will, a foot pedal for operating the clutch and means associated with the foot pedal and the moving part of the compressor for operating the compressor directly from the foot pedal should the driving mechanism fail to adequately operate the compressor.

14. In a motor vehicle, the combination of a transmission brake, hydraulically operable breaking means for certain of the wheels of the vehicle, mechanism controllable by the operator for operating said transmission brake, pumping means actuated by and upon operation of said transmission brake, and means communicating said pumping means with said hydraulically operable braking means whereby when said transmission brake is operated said pumping means causes operation of said hydraulically operable braking means.

15. In a motor vehicle, the combination of propelling mechanism for the vehicle, braking means on said propelling mechanism, means under the control of the operator for applying said braking means, hydraulically actuated braking means for certain of the wheels of said vehicle, and means automatically operated by said propelling mechanism when the first-mentioned braking means is applied and controlled thereby to cause application of said hydraulically actuated braking means.

16. In a motor vehicle, pumping means adapted to be actuated by the operation of a propeller shaft brake, a fluid actuated brake on a road wheel, means connecting said pumping means with said fluid actuated brake, and means under the control of the operator for controlling said pumping means whereby to cause application of said fluid actuated brake.

17. In a motor vehicle, a pump adapted to be driven by a brake mounted on an element rotating in direct relation to the speed of rotation of the driving wheels thereof, a fluid pressure actuated brake for a road wheel of said vehicle, means connecting said pump and said brake, and means under the control of the operator for controlling said pump.

18. In a motor vehicle, pumping means driven from the propeller shaft thereof, fluid pressure actuated brakes on certain road wheels of said vehicle in communication with said pumping means, means under the control of the operator for controlling said pumping means, and means whereby the pressure exerted by said pumping means is directly proportional to the braking effect exercised by said brakes.

19. In a motor vehicle, pumping means, friction means for driving said pumping means from the propeller shaft, fluid actuated road wheel brakes, means connecting said pumping means with said brakes whereby to actuate the latter from the former, and means under the control of the operator of said vehicle for controlling said device.

20. In a motor vehicle, a drum driven in direct relation with the rotation of the driving wheels thereof, friction means operable to engage said drum, a pump operatively connected to said friction device whereby to be operated upon engagement of said frictional device with said drum, fluid pressure actuated braking means for certain road wheels of said vehicle, means connecting said braking means with said pump whereby said braking means is operated upon operation of said pump, and means under the control of the operator of said vehicle for causing said frictional device to engage said drum.

In witness whereof, I hereunto subscribe my name this 28th day of April, 1924.

MALCOLM LOUGHEAD.